United States Patent
Hariri et al.

(10) Patent No.: US 10,318,795 B2
(45) Date of Patent: Jun. 11, 2019

(54) REMOTE CAMERA ACCESS

(71) Applicant: Faraday&Future Inc., Gardena, CA (US)

(72) Inventors: Mohamad Mwaffak Hariri, Dearborn Heights, MI (US); Adam Michael Kibit, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 244 days.

(21) Appl. No.: 15/582,652

(22) Filed: Apr. 29, 2017

(65) Prior Publication Data

US 2017/0316254 A1 Nov. 2, 2017

Related U.S. Application Data

(60) Provisional application No. 62/329,795, filed on Apr. 29, 2016.

(51) Int. Cl.
| | |
|---|---|
| *G06K 9/00* | (2006.01) |
| *B60R 25/30* | (2013.01) |
| *G07C 9/00* | (2006.01) |
| *B60R 25/24* | (2013.01) |

(52) U.S. Cl.
CPC .......... *G06K 9/00255* (2013.01); *B60R 25/24* (2013.01); *B60R 25/305* (2013.01); *G06K 9/00221* (2013.01); *G06K 9/00228* (2013.01); *G06K 9/00288* (2013.01); *G06K 9/00791* (2013.01); *G07C 9/00079* (2013.01); *G07C 9/00182* (2013.01); *G07C 9/00563* (2013.01); *G07C 9/00* (2013.01)

(58) Field of Classification Search
CPC .......... G06K 9/00255; G06K 9/00288; G06K 9/00791; G06K 9/00228; G06K 9/00221; B60R 25/24; B60R 25/305; G07C 9/00563; G07C 9/00182; G07C 9/00079; G07C 9/00

See application file for complete search history.

(56) References Cited

U.S. PATENT DOCUMENTS

| | | | |
|---|---|---|---|
| 2013/0179005 A1* | 7/2013 | Nishimoto | .......... B60R 25/1001 701/2 |
| 2017/0001598 A1* | 1/2017 | Pophale | .................. B60R 25/24 |
| 2017/0099295 A1* | 4/2017 | Ricci | ....................... H04W 4/21 |

* cited by examiner

*Primary Examiner* — Phuoc Tran
(74) *Attorney, Agent, or Firm* — Skyler R. Lund

(57) ABSTRACT

A vehicle configured to operate in a remote access mode is disclosed. In some examples, a camera at the exterior of the vehicle can capture one or more images of its surroundings, including the face of a person attempting to access the vehicle. A primary operator (e.g., owner or lessee) of the vehicle can receive the one or more images at a mobile device and send an input, via a user interface of the mobile device, to grant or deny access to the vehicle. In response to wirelessly receiving the input to allow access, the vehicle can be unlocked and started in the remote access mode. In some examples, the remote access mode can have a set of permissions and/or restrictions associated therewith.

17 Claims, 5 Drawing Sheets

REMOTE CAMERA ACCESS

CROSS-REFERENCE TO RELATED APPLICATIONS

This application claims the benefit of U.S. Provisional Application No. 62/329,795, filed Apr. 29, 2016, the entirety of which is hereby incorporated by reference.

FIELD OF THE DISCLOSURE

This relates to a connected vehicle featuring a camera and, more particularly, to a connected vehicle configured to transmit live video from its camera and to receive remote input to unlock and/or start the vehicle.

BACKGROUND OF THE DISCLOSURE

In the field of consumer automobiles, vehicle access technology has improved, making it more convenient for consumers to lock, unlock, and start their vehicles. Physical keys can be replaced with remotes, which can in turn be replaced with key fobs capable of wirelessly enabling buttons on the interior and exterior of the vehicle to perform the functions of physical keys, for example. In some examples, consumers can control vehicle locks and doors, activate a car alarm, and start the vehicle remotely, sometimes without touching a dedicated key, remote, or fob. To share access to a vehicle with another person, a primary operator can give that person the vehicle's associated key, remote, or fob. For situations where lending a key, remote, or fob is inconvenient or impractical, there exists a need in the field of consumer automobiles for a method of securely sharing vehicle access via a mobile device in the absence of a physical key, remote, or fob.

SUMMARY OF THE DISCLOSURE

This relates to a connected vehicle featuring a camera and, more particularly, to a connected vehicle configured to transmit live video from its camera and to receive remote input to unlock and start the vehicle. In some examples, a mobile device (e.g. a smartphone, tablet, or other computing device) connected to the vehicle using Bluetooth, a cellular network, Wi-Fi, or any suitable wireless network can perform the functions of a vehicle key, remote, or fob. Using a primary operator's mobile device to unlock and start a vehicle adds convenience, as the primary operator need not carry a dedicated key, remote, or fob to use the vehicle, for example. In some examples, a disadvantage of operating a vehicle via connection to a mobile device can be that sharing the vehicle with a friend, relative, or valet parking attendant can become more challenging than providing that person with a key, remote, or fob, because such sharing may require sharing of the mobile device (e.g., a smartphone). In some examples, a vehicle can have several operation modes for vehicle sharing with various security settings associated therewith. For example, one or more of these operation modes can include speed limits, geofences, and restricted access to the vehicle's infotainment system. In some examples, under normal operating conditions, a vehicle can be accessed or operated via a short-range wireless connection to a wireless device (e.g. a smartphone, a key, a remote control, etc.) associated with a primary operator of the vehicle. However, in some examples, one or more remote access modes of the vehicle can allow starting the vehicle remotely, without a key, a remote control, or a short-range wireless connection to a wireless device (e.g. a smartphone, a key, a remote control, etc.) associated with a primary operator of the vehicle.

DETAILED DESCRIPTION

Figure 1:
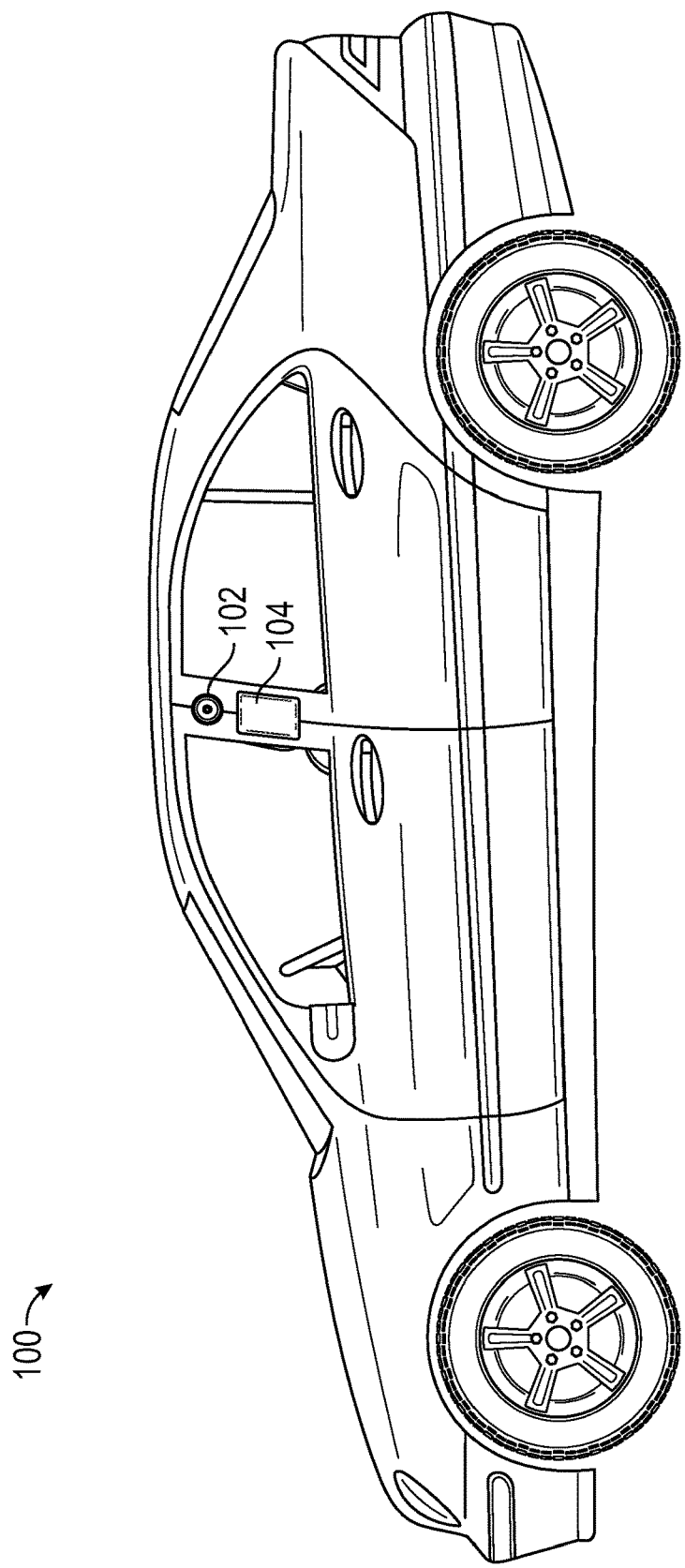
FIG. 1 illustrates a connected vehicle with an exterior camera and touchscreen according to examples of the disclosure.

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

This relates to a connected vehicle featuring a camera and, more particularly, to a connected vehicle configured to transmit live video from its camera and to receive remote input to unlock and start the vehicle. In some examples, a vehicle can have several operation modes with various security settings associated therewith. For example, one or more of these operation modes can include speed limits, geofences, and restricted access to the vehicle's infotainment system. In some examples, under normal operating conditions, a vehicle can be accessed or operated via a short-range wireless connection to a wireless device (e.g. a smartphone, a key, a remote control, etc.) associated with a primary operator of the vehicle. However, in some examples, one or more remote access modes of the vehicle can allow starting the vehicle remotely, without a key, remote control, or short-range wireless connection to a wireless device (e.g. a smartphone, a key, a remote control, etc.) associated with a primary operator of the vehicle.

Improvements to vehicle access technology have provided consumers with increased convenience when locking, unlocking, and accessing their vehicles. For example, physical keys for unlocking and starting a vehicle can be replaced with remote controls, which can in turn be replaced with key fobs. In some examples, key fobs can transmit a wireless signal to a vehicle allowing a driver to use buttons on the vehicle to unlock doors and start the vehicle without physically interacting with the fob. In some examples, a vehicle can be unlocked and started based on a short-range wireless connection to a user's mobile device (e.g. smartphone, tablet, or other suitable mobile device). Allowing vehicle access and operation via a connection to a mobile device can be convenient, as a user need not carry a dedicated key, remote, or fob to operate their vehicle, for example. In some examples, however, a primary operator of a vehicle, such as an owner, a lessee, or another person with a mobile device configured to control the vehicle, may want to let someone else drive the vehicle without giving them their mobile device or configuring that person's mobile device to operate the vehicle. In some examples of the disclosure, the primary operator of the vehicle can remotely configure the vehicle to operate in one of a plurality of remote access modes that allow starting and operation of the vehicle for and by another person without the need to give the other person the primary operator's associated mobile device.

As mentioned above, in some examples, a vehicle of the disclosure can be operated in a remote access mode, allowing the vehicle to be accessed and started without a key, remote, fob, or short-range connection to a primary operator's mobile device. For example, the vehicle's primary operator may want to provide a parking attendant access to their vehicle, independent of a short-range wireless connection between their mobile device and the vehicle, for example. In addition to providing remote, secure vehicle access, a remote access mode for valet parking can include a set of permissions or restrictions that can be effect in the remote access mode, such as speed limits, geofences, required destination, and/or restricted access to the infotainment system, for example. In some examples, a speed limit, geofence, and/or required destination can be set in the remote access mode to ensure the vehicle will not be driven for any purpose other than parking the vehicle and retrieving it, for example. Restricting access to the infotainment system can protect private information stored thereon, such as contacts or bookmarked locations for the navigation system, for example. In some examples, a vehicle's primary operator can modify the permissions associated with a remote access mode for valet parking. For example, a vehicle's primary operator may remove or modify a geofence so that the parking attendant can move the vehicle to an electric vehicle recharging station that may be located outside of the geofence. Other permissions and modifications are possible.

As another example, a remote access mode of a vehicle of the disclosure can be used to allow someone to drive the vehicle to deliver it to the vehicle's primary operator. For example, after servicing a vehicle, the remote access mode can allow a mechanic may drive the vehicle to the primary operator's home. In this example, the vehicle can be unlocked and started independent of a short-range wireless connection between the vehicle and a mobile device (e.g. a smartphone, a tablet, or other suitable computing device) associated with the vehicle's primary operator (e.g., the vehicle can be unlocked and started without a key fob). In some examples, a remote access mode associated with post-maintenance delivery of a vehicle can include a set of permissions associated therewith, such as a speed limit, a geofence, a required destination and/or restricted access to the infotainment system, for example. In some examples, a vehicle's primary operator can modify the permissions associated with a remote access mode for post-maintenance delivery remotely (e.g., from a smartphone or equivalent device).

In some examples, a vehicle can be outfitted with external sensors and/or controls to facilitate the above- and below-described remote access modes of the vehicle. FIG. 1 illustrates a connected vehicle 100 with an exterior camera 102 and touchscreen 104 according to examples of the disclosure. Camera 102 and/or touchscreen 104 can be located on the B-pillar of vehicle 100 (as illustrated), though it is understood that other locations, such as the hood, the trunk, or an alternate location on or near the driver's side door, for example, for the camera and the touchscreen are possible. In some examples, one or more remote access modes of vehicle 100 can use camera 102 to facilitate verification of the identity of a person attempting to operate vehicle 100 as part of granting the person access to the vehicle. In some examples, camera 102 can be activated remotely by a vehicle's primary operator (e.g., via their smartphone) before they allow or deny access to the vehicle 100. Additionally or alternatively, in some examples, a person requesting remote access to vehicle 100 can use the touchscreen 104 on the outside of vehicle 100 to send an access request to the primary operator's mobile device. In response to the access request, the primary operator's mobile device can display a prompt to activate camera 102 so the vehicle's primary operator can see who is requesting access to the vehicle, for example. Additional details of granting access to vehicle 100 using camera 102 and/or touchscreen 104 will be described in more detail below.

Figure 2:
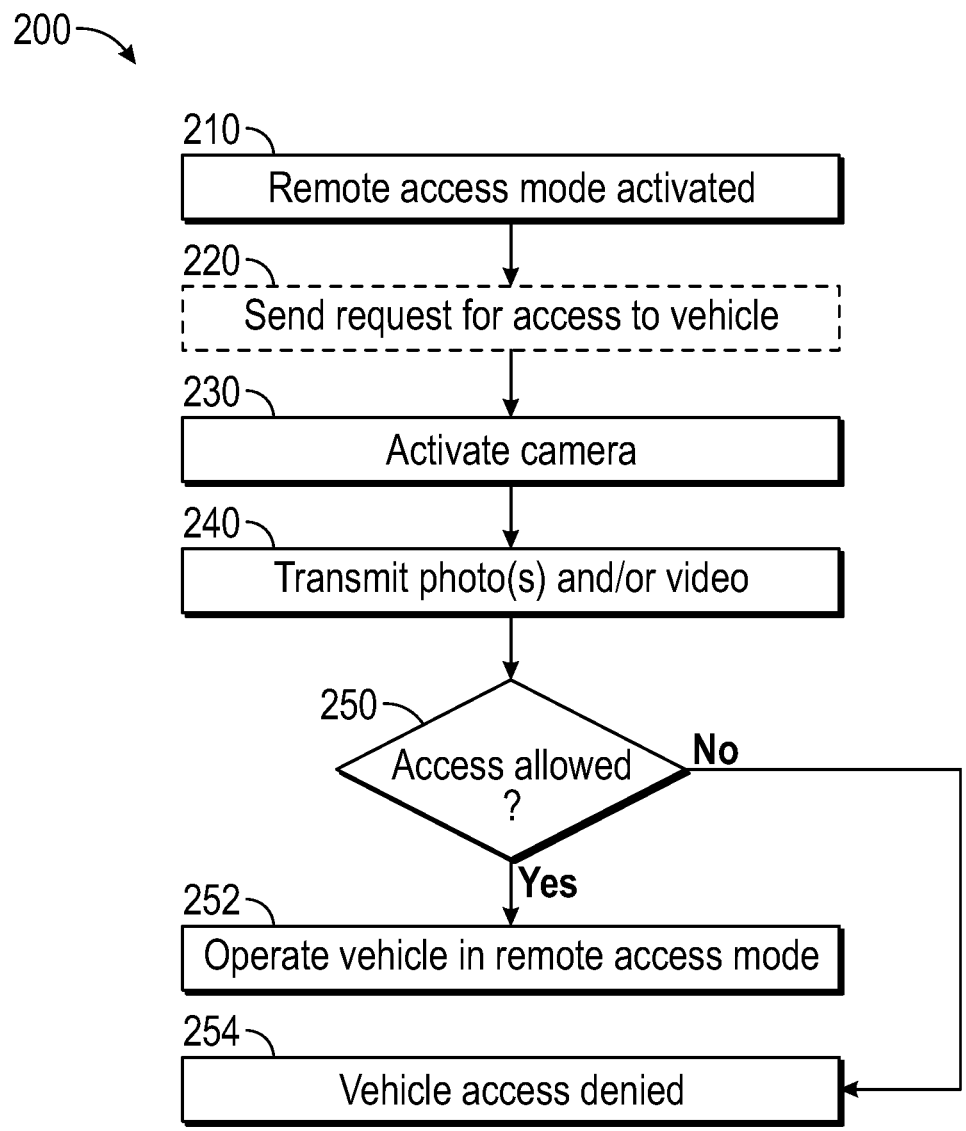
FIG. 2 illustrates a method of accessing a vehicle in a remote access mode according to examples of the disclosure.

In some examples, a vehicle of the disclosure can operate in a remote access mode, as described in this disclosure. FIG. 2 illustrates a method 200 of accessing a vehicle in a remote access mode according to examples of the disclosure. Method 200 can be performed at a vehicle of the disclosure, for example. In step 210, for example, a remote access mode of the vehicle can be activated. In some examples, the remote access mode can be activated at an infotainment unit of the vehicle, such as vehicle 100 described with reference to FIG. 1, or at a mobile device associated with a primary operator of vehicle 100. For example, an operator of the vehicle can press a button in the vehicle or on the operator's smartphone to activate the remote access mode. Additionally or alternatively, a vehicle operator may use the infotainment unit to activate the remote access mode just before exiting the vehicle and allowing it to be parked by a valet parking attendant, for example. In some examples, the vehicle's primary operator may activate the remote access mode from their mobile device (e.g. smartphone) in a situation where they are not in the vehicle, such as when the vehicle is at a repair shop for maintenance, for example. In some examples, a primary operator may modify restrictions, such as those described above and below, to be put in place while the vehicle operates in the remote access mode. In some examples, the remote access mode can be activated while the vehicle 100 is in use or while it is turned off. While in the remote access mode at step 220, in some examples, a request can be made to enable remote vehicle access. As described with reference to FIG. 1, a person requesting access, such as a parking attendant, a mechanic, friend, or relative of the vehicle's primary operator, can use touchscreen 104 to send a signal to the primary operator of vehicle 100 to request access, for example. The signal can be transmitted from the vehicle 100 to a mobile device (e.g., smartphone, tablet, or other computing device) associated with a primary operator of the vehicle via a wireless connection such as a Wi-Fi, a cellular network, or another suitable network connection, for example. In some examples, step 220 is optionally not performed or can be activated or deactivated based on input from a vehicle's primary operator (e.g., the vehicle can be configured to require or not require step 220 in allowing access to the vehicle). When step 220 is not performed, the vehicle's primary operator can activate the vehicle's exterior camera remotely from their mobile device at 230, for example. In some examples, step 220 can be performed in some remote access modes and not performed in other remote access modes, as selected by a vehicle's primary operator. For example, a vehicle's primary operator may want to allow notifications from the exterior screen when they know their vehicle is parked in the way of another vehicle and an authorized person may want to move it—in other circumstances, the primary operator may disable notifications from the exterior screen on the vehicle. Next, at step 230, in some examples, an exterior camera on the vehicle can be activated, such as camera 102 on vehicle 100 described with reference to FIG. 1. Camera 102 can be activated in response to input from a primary operator of vehicle 100, for example, such as via input to their mobile device. In some examples, the input can be in response to receiving a notification at the mobile device as described in step 220. Additionally or alternatively, for example, a vehicle's primary operator can activate camera 102 without a prompt from the vehicle 100, such as in a situation where notifications from the vehicle's exterior touch screen have been disabled, for example. In some examples, camera 102 is activated based on input at an exterior touchscreen 104 of vehicle 100 (e.g., the input requesting access to the vehicle), without the need for input from the primary operator of the vehicle. In some examples, camera 102 can be activated in response to the vehicle detecting motion within a threshold distance of the vehicle and/or within a threshold distance of one or more doors or trunk of the vehicle. Once activated, in some examples, camera 102 can capture one or more photos and/or videos of the vehicle's surroundings. In step 240, in some examples, the one or more photos and/or videos can be transmitted to a primary operator of the vehicle (e.g., the primary operator's smartphone or equivalent device) so that they can see who is requesting access to the vehicle. In some examples, a video recording can be transmitted in real-time to a vehicle's primary operator as live video. In some examples, the primary operator of the vehicle can decide whether or not to provide vehicle access at step 250. For example, the primary operator's smartphone can display options for allowing vehicle access or denying vehicle access. In some examples, the primary operator of the vehicle can also specify restrictions on vehicle operation at step 250 using, for example, the primary operator's mobile device—additional details of such restrictions will be described later. In response to an input allowing access at 250, vehicle 100 can operate in a remote access mode at step 252, for example. In some examples, at step 252 the vehicle 100 can be unlocked and started, and the person requesting access to the vehicle can get in the vehicle and drive it. For the purposes of the disclosure, "starting" a vehicle can include starting a gasoline engine in a vehicle that includes such an engine, and/or initializing or otherwise powering-up an electric motor in a vehicle that includes such a motor. In some examples, the remote access mode includes restrictions, such as a speed limit, geofence, approved destination, locked compartments, and/or restricted access to the infotainment system. In some examples, the remote access mode (or a customizable mode) can be defined by the primary operator using a program on the mobile device. The remote access mode can be define in response to an access request transmitted from the vehicle or at any time. In one example, the primary operator can initiate a program on the mobile device that allows him/her to set one or more restrictions including but not limited to speed limits, geofences, approved destinations, restricted access to the infotainment system/autonomous driving mode, access to physical storage areas/personal profiles stored in the vehicle. The restrictions/settings associated with a particular mode (e.g., remote access mode) can be saved in a profile that can be selected at a later time. When saved (or when selected), the restrictions/settings can be transmitted to and stored in the vehicle. In response to an input for denying access at 250, in some examples, vehicle access can be denied at step 254. Additionally, in some examples, at step 254, vehicle 100 can remain locked and be prevented from starting in response to an input to deny access received at 250, for example. Additionally or alternatively, in some examples, touchscreen 104 can be disabled for some period of time to avoid repeat notifications from an unauthorized person. In some examples, communication between a primary operator's mobile device and the vehicle can occur over Wi-Fi, a cellular network, or any other suitable wireless connection. Once the vehicle's primary operator no longer wants the vehicle to be accessible remotely, they can terminate remote access mode via an input on their mobile device or to the infotainment system or exterior touch screen, for example. In some examples, remote access mode can automatically be disabled after a selected period of time or when a short-range wireless communication between the primary vehicle operator's mobile device (or key) and the vehicle resumes independent of or in combination with an input to the exterior touch screen or infotainment panel of the vehicle. When the remote access mode of the vehicle is terminated, touchscreen 104 and/or the ability to request access to the vehicle from the touchscreen can be disabled.

Figure 3:
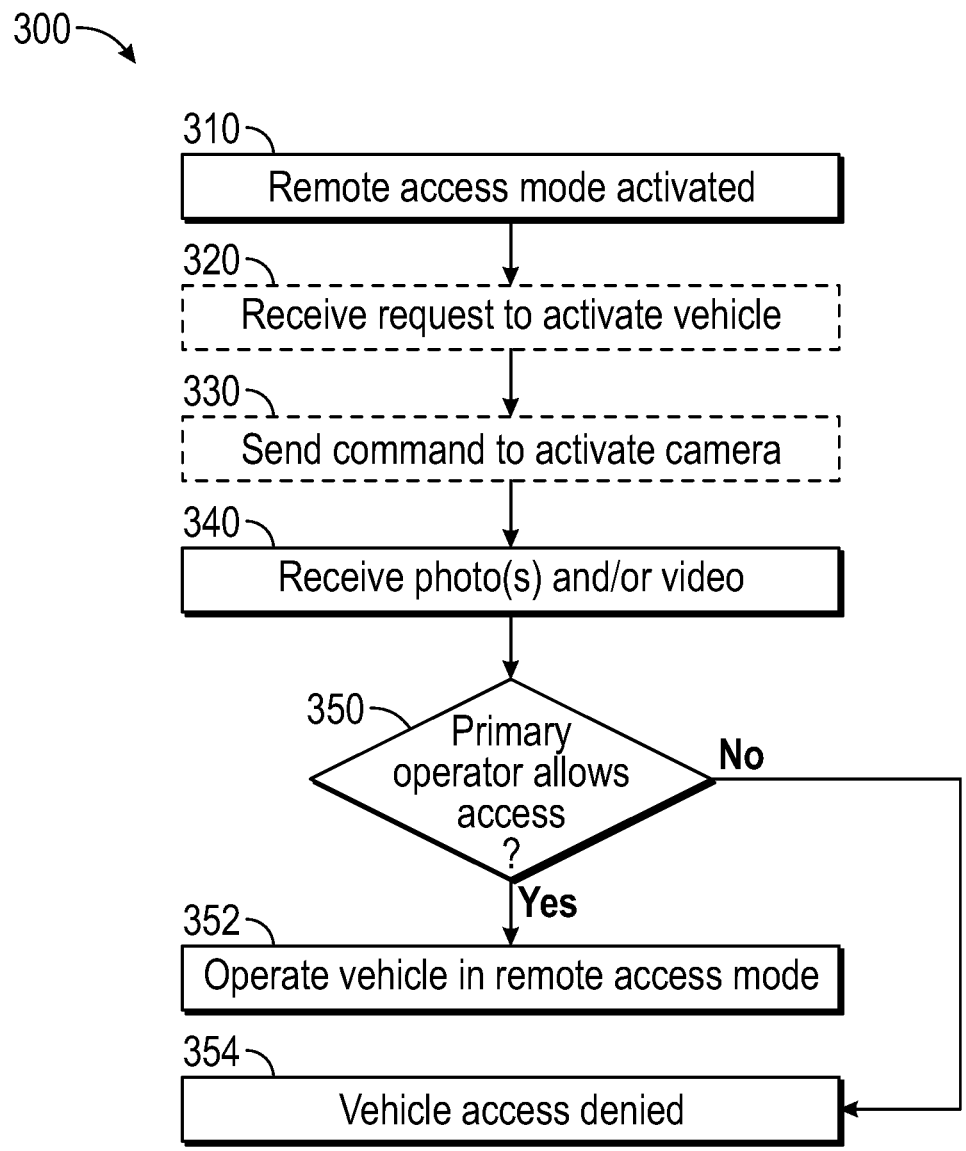
FIG. 3 illustrates a method of providing remote access to a vehicle according to examples of the disclosure.

As described above, in some examples, a vehicle's primary operator can remotely control access to a vehicle in a remote access mode and/or modify permissions and restrictions associated with the mode, as will be described below. FIG. 3 illustrates a method 300 of providing remote access to a vehicle according to examples of the disclosure. Method 300 can be performed at a mobile device associated with a vehicle's primary operator, for example. In some examples, method 300 can be performed by a smartphone, tablet, or other computing device. At step 310, one of a plurality of remote access modes can be selected for a vehicle, such as vehicle 100 described with reference to FIGS. 1-2, in which to operate, for example. In some examples, this input can be provided on a user interface of a smartphone, tablet, or other computing device in communication with vehicle 100 via a wireless connection such as Bluetooth, Wi-Fi, a cellular data network, or any other suitable wireless connection. In some examples, selecting a remote access mode can include selecting or modifying permissions and restrictions, including how permissions and restrictions are enforced, associated with the selected mode, as will be described below. While the vehicle operates in a remote access mode, in some examples, a request for vehicle access can be received at a mobile device executing method 300 at step 320 from the vehicle. A person can generate the request via touchscreen 104 included at the exterior of vehicle 100 described with reference to FIGS. 1-2, for example. Alternatively, the person can send a request to access the vehicle using an app on his/her mobile device. In some examples, step 320 is optionally not performed and the rest of the method may proceed based on unprompted input from the primary operator of the vehicle to do so. Next, at step 330, in some examples, a vehicle's primary operator can send a command via their mobile device to activate an exterior camera of the vehicle (or the mobile device), such as camera 102 on vehicle 100 described with reference to FIGS. 1-2. In some examples, step 330 can optionally be not performed and camera 102 can activate in response to input received at touchscreen 104 or automatically, as previously described. While the vehicle operates in a remote access mode with an exterior camera on, in some examples, at step 340 a vehicle's primary operator can receive one or more photos and/or videos captured by the external camera (e.g. camera 102 in FIG. 1) at their mobile device. In some examples, captured video can be received in real-time, thus providing the vehicle's primary operator with a live video of the exterior of the vehicle via their mobile device. Alternatively or additionally, if the initial request was made from a mobile device, the vehicle can detect whether the mobile device is within close proximity of the vehicle (e.g., within Bluetooth range), and transmit a signal to the primary operator's device indicating that the request was made from a mobile device within close proximity of the vehicle. Upon receiving the one or more photos and/or videos captured by camera 102 (and the signal from the vehicle), a vehicle's primary operator can determine who is requesting access to the vehicle and can decide whether or not to grant access in step 350, for example. While viewing the photos and/or video, in some examples, the vehicle's primary operator can be presented with inputs to either allow access or deny access to the vehicle at their mobile device, for example. In response to an input to grant access, in some examples, the vehicle can unlock, start, and be operated in a remote access mode at step 352. In some examples, operating in a remote access mode includes operating with a set of permissions and/or restrictions as set by the vehicle's primary operator. In response to an input to deny access, in some examples, the vehicle can remain locked and prevented from starting. Additionally, in some examples, in response to an input to deny access, requests for access via exterior touchscreen 104 can be blocked for some period of time to avoid repeat notifications from unauthorized individuals. In some examples, communication between a primary operator's mobile device and the vehicle can occur over Wi-Fi, a cellular network, or any other suitable wireless connection. In some examples, while the vehicle operates in a remote access mode, the primary operator can modify, via controls on their mobile device, one or more permissions or restrictions associated with the remote access mode.

Figure 4:
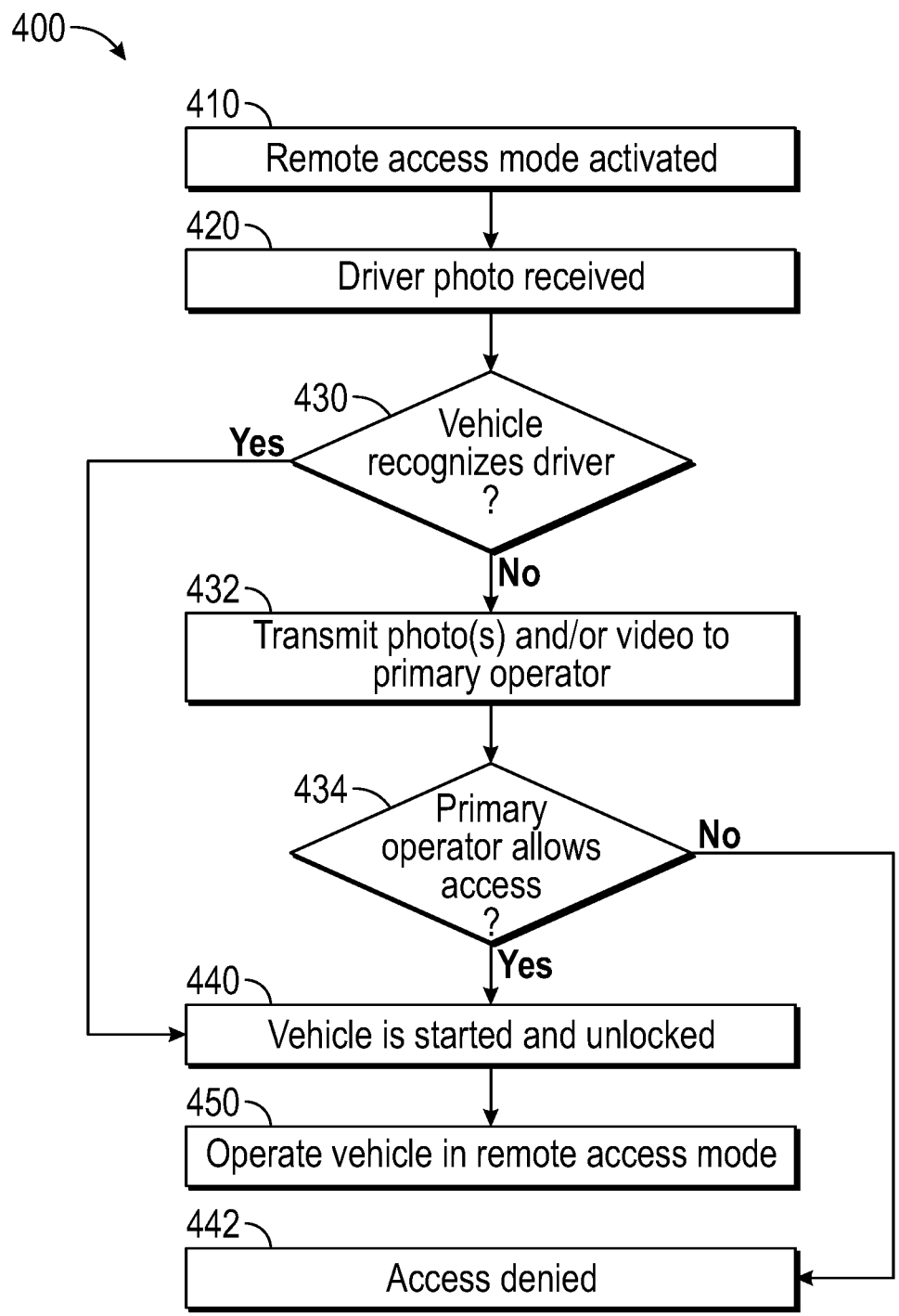
FIG. 4 illustrates a method for enabling remote access to a vehicle according to examples of the disclosure.

In some examples, a vehicle's primary operator can send a photo of an authorized person's face to a vehicle of the disclosure to facilitate remote access using facial recognition. For example, a vehicle's primary operator may want one or more mechanics to have access to the vehicle while it is at a repair shop. FIG. 4 illustrates a method 400 for enabling remote access to a vehicle according to examples of the disclosure. First, in some examples, a vehicle's primary operator can activate a remote access mode in step 410, as previously described. The remote access mode can have unlocking rules and other permissions associated therewith, such as speed limits, geofences, approved destinations, or restricted access to the infotainment system, for example. Other restrictions are possible. In some examples, a remote access mode can allow the vehicle to operate independent of a short-range wireless connection to a mobile device (e.g. a smartphone, tablet, a key fob, or any other suitable computing device) associated with a vehicle's primary operator. While in a remote access mode, in some examples, at step 420 a vehicle can receive one or more images of an authorized person's face. For example, a vehicle's primary operator can send the one or more images of one or more authorized persons from their mobile device to the vehicle, such as vehicle 100 described with reference to FIG. 1. In some examples, a vehicle's primary operator can send the one or more photos to the vehicle 100 prior to activating a remote access mode. The one or more photos of the authorized person can be pre-stored, allowing the vehicle's primary operator to simply re-select the one or more photos as corresponding to an authorized person from a listing of one or more persons, for example. Once one or more transmitted or pre-stored photos have been associated with an authorized person, that person can capture an image of their face using an exterior camera, such as camera 102 on vehicle 100, for example. For example, the authorized person can request access to the vehicle at touchscreen 104, which can activate camera 102. Touchscreen 104 can then prompt the person to position their face at the proper location with respect to camera 102 to capture one or more images of the person's face. Next, in step 430, in some examples, a processor included in the vehicle can execute one or more facial recognition and/or other image processing algorithms on the captured images to determine if the face of the person matches the photo of the authorized person previously sent by the primary operator to the vehicle. In accordance with a determination that the person matches the photo of the authorized person, the vehicle can be started and unlocked in step 440, for example. In some examples, the primary operator of the vehicle can have designated specified restrictions associated with the authorized person, and the vehicle can be operated with those specified restrictions in response to identifying the person. Other authorized persons can similarly be associated with their own specified restrictions. In accordance with a determination that the person does not match the photo of the authorized person, one or more photos and/or live video can be captured and transmitted to the primary operator of the vehicle in step 432 as previously described, for example. Upon receiving the one or more photos and/or live video, the vehicle's primary operator can decide whether or not to grant access to the vehicle, as previously described. While viewing the one or more photos and/or live video, in some examples, the vehicle's primary operator can be presented with inputs for allowing or denying vehicle access in step 434. In accordance with a determination that an input to deny access has been received, in some examples, in step 442 the vehicle will be prevented from unlocking and starting. Additionally, in some examples, the camera 102 and exterior touchscreen 104 can be disabled for a period of time to avoid repeat notifications from an unauthorized person, as previously described. In accordance with a determination that an input to allow access has been received, in some examples, the method can proceed to step 440 where the vehicle can be started and unlocked. In some examples, once the vehicle is started and unlocked, whether based on a match to one or more photos of an authorized person, based on primary operator input, or any other suitable input, the vehicle can be operated in a remote access mode in step 450. The remote access mode may have permissions associated therewith such as a speed limit, geofences, approved destinations, locked compartments and/or restricted access to an infotainment system, for example. In some examples, a vehicle's primary operator can modify these permissions remotely at any time. Once the vehicle's primary operator no longer wants the vehicle to be accessible remotely, they can terminate remote access mode via an input on their smartphone or to the infotainment system or exterior touch screen, for example. In some examples, remote access mode can automatically be disabled after a selected period of time or when a short-range wireless communication between the primary vehicle operator's mobile device and the vehicle resumes independent of or in combination with an input to the exterior touch screen or infotainment panel of the vehicle.

In some examples, a vehicle's primary operator can decide how various restrictions associated with the remote access modes of the disclosure, as described above, are enforced for each remote access mode. In some examples, a vehicle's primary operator can receive an alert on their mobile device when a restriction is violated in any of the manners described below, including violations of restriction warning thresholds (described in more detail below). An infotainment system included in the vehicle can also display an alert or play a sound or recording so the driver knows they have violated a restriction, for example—the alert can indicate to the vehicle occupant the restriction being violated. Further, in some examples, the infotainment system and/or the exterior touchscreen on the vehicle (e.g., touchscreen 104) can list the restrictions in effect while the person is operating the vehicle, so that the person knows the restrictions within which the person must operate the vehicle. While operating in the remote access mode, for example, if the driver increases vehicle speed past a specified speed limit, exits the geofenced area, diverts from a route to an approved destination, or if an interior camera detects a number of passengers exceeding a passenger limit as part of a restriction set by the primary operator of the vehicle, the notifications may be generated. In some examples, the primary operator of the vehicle may feel these notifications are sufficient to enforce the vehicle restrictions. In some examples, the primary operator of the vehicle can decide, via their mobile device, how the vehicle should respond to the above- or below-described violations of restrictions at the time the violations occur.

In some examples, one or more restrictions can have a lowered or "warning" threshold. For example, while operating in the remote access mode, if a driver exceeds a lowered threshold for a speed limit, a geofence, or a route to an approved destination, they may receive a warning via the vehicle's infotainment system. In some examples, the warning can include a sound or audio recording and/or a visual display, such as a written warning or an icon displayed on a display inside the vehicle (e.g., as part of the infotainment system of the vehicle). A lowered threshold for a speed limit could be a certain number of miles per hour or percent below an associated upper threshold, such as five miles per hour or ten percent, for example. A lowered threshold for a geofence could be within a set distance or a percent of the upper threshold geofence, such as an extra half mile or twenty-five percent radius, for example. A lowered threshold for diverting from an approved destination could be making a certain number of "wrong" turns relative to a selected route or deviating from a selected route to add a threshold delay to arrival time, such as a delay of 10 minutes or fifty percent of the optimal route travel time. In some examples, other lowered thresholds or types of restrictions are possible. By providing a warning at a lowered threshold, the driver can modify their speed, location, or route to follow set restrictions, for example.

In some examples, restrictions can include upper thresholds where the vehicle stops operating if the upper threshold is exceeded. To enforce a speed limit, for example, the vehicle can stop accelerating once it reaches an upper threshold. To enforce a geofence or approved destination, for example, the vehicle could decelerate and stop moving or operate in an autonomous driving mode in response to an exceeded upper threshold for a geofence or approved destination route divergence. In some examples, when an upper threshold for a geofence or approved destination route is exceeded, a vehicle can enter an autonomous driving mode to return the vehicle to a pre-set location. Examples of pre-set locations can include a location where the remote access mode was activated, the approved location, or the closest location within the geofence radius by a certain amount. In some examples, the primary operator of the vehicle can specify, via their mobile device, to where they would like the vehicle to autonomously travel. Other responses to an exceeded upper threshold and other types of restrictions are possible in some examples.

Other restrictions, such as restricted infotainment access or restricted ability to unlock a vehicle's trunk, glovebox, or other interior compartment, can be enforced by disabling access while the vehicle is in a remote access mode. For example, an infotainment system may not display user input for stored information, such as contacts, saved locations in a navigation system, or stored media (e.g. audio files), while the vehicle is operating in the remote access mode. Trunks, gloveboxes, or other interior compartments of a vehicle may have a secondary lock that activates when the vehicle is in a remote access mode so that these compartments cannot be opened, for example. Similarly, for example, in accordance with a determination that a passenger limit has been exceeded, the vehicle may be prevented from moving. Other restrictions and enforcement methods are possible.

Figure 5:
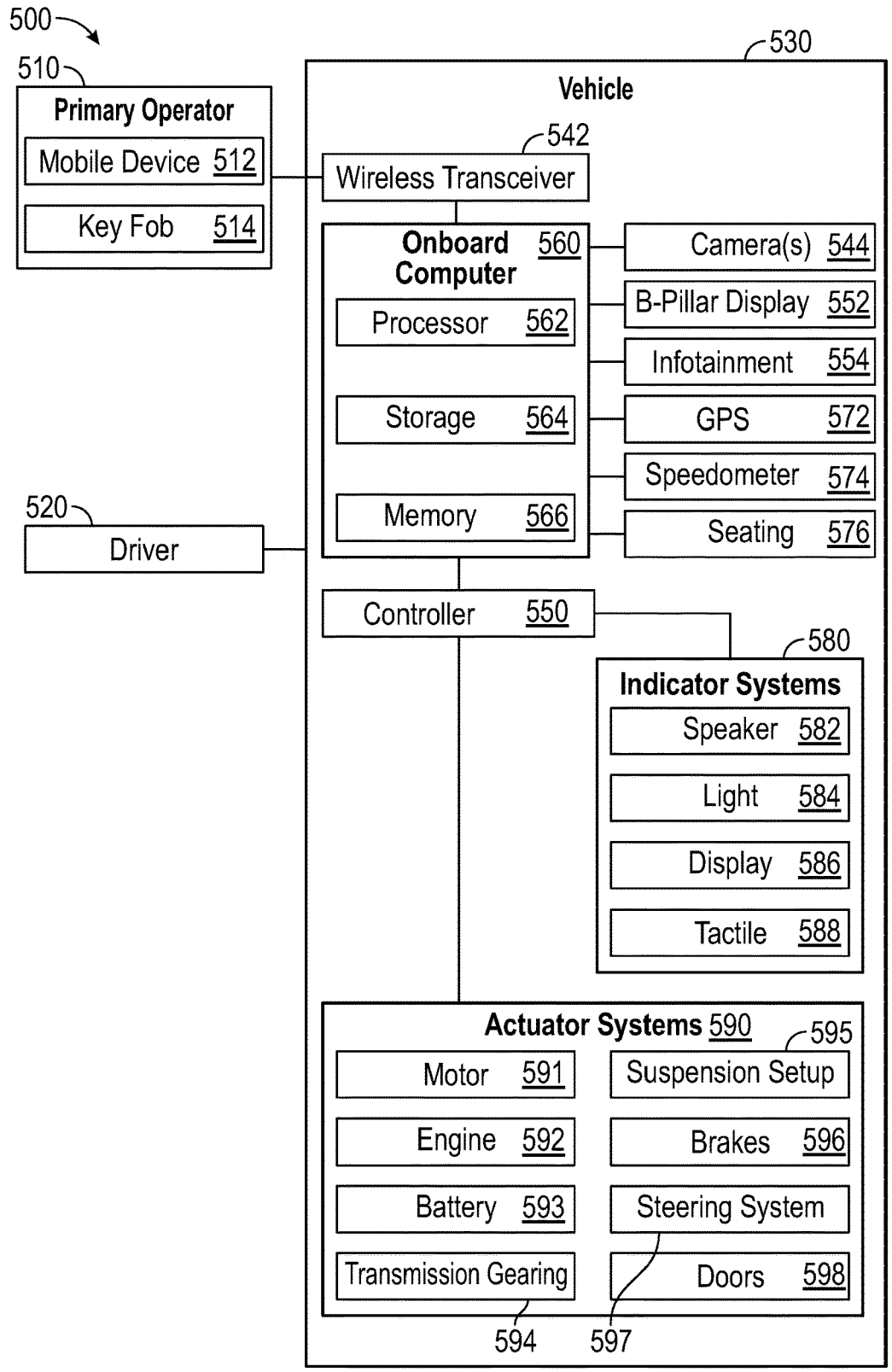
FIG. 5 illustrates a system block diagram according to examples of the disclosure.

FIG. 5 illustrates a system block diagram 500 according to examples of the disclosure. In some examples, a vehicle's primary operator 510 can interact with vehicle 530 remotely via a mobile device 512 and/or a key fob 514. In some examples, mobile device 512 can be a smartphone, a tablet, or another other suitable computing device, for example. As described with reference to FIGS. 2-4, in some examples, the primary operator of the vehicle 510 can use their mobile device or smartphone 512 to remotely enable access to a driver 520. The driver 520 can interact with the vehicle 530 to receive access and to drive the vehicle 530 in a remote access mode, for example. In some examples, the vehicle 530 can include a wireless transceiver 542 to communicate with the vehicle's primary operator 510 over a short-range wireless network (e.g. Bluetooth, Near Field Communication, ZigBee, etc.) and/or a long-range wireless network (e.g. Wi-Fi, cellular data network, etc.). Vehicle 530 can further include one or more cameras 544, such as camera 102 described with reference to FIG. 1, for example. One or more cameras 544 included in vehicle 530 can be used to capture an image of a person attempting to access vehicle 530 as part of any of the processes described with reference to FIGS. 2-4, for example. In some examples, vehicle 530 can include interactive components such as B-pillar display 552 and/or infotainment system 554. B-pillar display 552 can be the external touchscreen 104 described with reference to FIG. 1. Additionally or alternatively, other external touchscreens can be included in vehicle 530. An infotainment system 554 can be provided as a means for a driver 520 to receive and or send information while interacting with vehicle 530, for example. In some examples, vehicle 530 can include an onboard computer 560 operatively coupled to wireless transceiver 542 and several electronic systems of the vehicle 530, as will be described. Onboard computer 560 can include a processor 562, storage 564, and memory 566, for example. In some examples, processor 562 can perform any of the steps of the methods described with reference to FIGS. 2-4. Processor 562 can be used for additional functions as well, such as managing any other system of vehicle 530 and/or permissions set by primary operator 510 for each of one or more remote access modes, for example. In some examples, vehicle 530 can further include several systems related to vehicle permissions and customization, such as GPS 572, speedometer 574, and/or seating 576. Speed limits and/or geofences can be enabled and/or monitored, for example, via GPS 572 and speedometer 574, respectively.

In some examples, the vehicle 530 can further include controller 550 operatively coupled to one or more actuator systems 590 in the vehicle 530 and one or more indicator systems 580 in the vehicle. The one or more actuator systems 590 can include, but are not limited to, a motor 591 or engine 592, battery system 593, transmission gearing 594, suspension setup 595, brakes 596, steering system 597 and door system 598. The controller 550 can control one or more of these actuator systems 590 during vehicle operation; for example, to open or close one or more of the doors of the vehicle using the door actuator system 598, to control the vehicle in accordance with various restrictions associated with remote access modes of the vehicle, using the motor 591 or engine 592, battery system 593, transmission gearing 594, suspension setup 595, brakes 596 and/or steering system 597, etc. The one or more indicator systems 580 can include, but are not limited to, one or more speakers 582 in the vehicle (e.g., as part of an infotainment system 554 in the vehicle 530), one or more lights 584 in the vehicle 530, one or more displays 586 in the vehicle (e.g., as part of a control or infotainment system in the vehicle) and one or more tactile actuators 588 in the vehicle (e.g., as part of a steering wheel or seat in the vehicle). The vehicle controller 550 can control one or more of these indicator systems 580 to provide indications to a driver 520 of the vehicle (e.g., to alert the driver that a permission or restriction threshold has been violated).

Therefore, according to the above, some examples of the disclosure are directed to: a vehicle comprising: one or more cameras; a wireless transceiver; and a processor operatively coupled to the one or more cameras and the wireless transceiver, the processor configured for: capturing one or more images of surroundings of the vehicle at the one or more cameras; transmitting, using the wireless transceiver, the one or more images to a mobile device; receiving, at the wireless transceiver, an input from the mobile device, the input comprising one of an indication to provide access to the vehicle and an indication to prevent access to the vehicle; and in response to receiving the indication to provide access to the vehicle: starting the vehicle in a remote access mode, and operating the vehicle with one or more vehicle restrictions associated with the remote access mode. Additionally or alternatively to one or more of the examples disclosed above, in some examples, wherein the processor is further configured for: in response to receiving the indication to provide access to the vehicle: unlocking one or more locks coupled to one or more doors of the vehicle; and initializing a motor of the vehicle; and in response to receiving the indication to prevent access to the vehicle: preventing the one or more locks coupled the one or more doors of the vehicle from being unlocked; preventing the initialization of the motor of the vehicle; and preventing the vehicle from operating in the remote access mode. Additionally or alternatively to one or more of the examples disclosed above, in some examples, wherein the vehicle restrictions associated with the remote access mode includes one or more of a geofence, an approved destination and a speed limit. Additionally or alternatively to one or more of the examples disclosed above, in some examples, wherein the vehicle further comprises an infotainment system with access to a plurality of files, the plurality of files including one or more of contact files, location files, and audio files stored thereon, and operating the vehicle with the one or more vehicle restrictions includes restricting access to one or more of the plurality of files. Additionally or alternatively to one or more of the examples disclosed above, in some examples, the processor further is configured for: prior to capturing the one or more images at the one or more cameras, receiving an input to capture the one or more images. Additionally or alternatively to one or more of the examples disclosed above, in some examples, the vehicle further comprises a touchscreen disposed on an exterior of the vehicle proximate to one of the one or more cameras, wherein the input to capture the one or more images comprises an input detected at the touchscreen. Additionally or alternatively to one or more of the examples disclosed above, in some examples, the input to capture the one or more images is generated by the mobile device and received by the transceiver. Additionally or alternatively to one or more of the examples disclosed above, in some examples, the one or more images comprise a video. Additionally or alternatively to one or more of the examples disclosed above, in some examples, the one or more vehicle restrictions restrict one or more of a vehicle speed, a vehicle location, and a navigation route of the vehicle. Additionally or alternatively to one or more of the examples disclosed above, in some examples, the one or more vehicle restrictions are selected via one or more restriction inputs received from the mobile device. Additionally or alternatively to one or more of the examples disclosed above, in some examples, the processor is further configured for: while operating the vehicle with the one or more vehicle restrictions associated with the remote access mode, monitoring the operation of the vehicle to determine whether the operation of the vehicle violates the one or more vehicle restrictions; and in accordance with a determination that the operation of the vehicle violates the one or more vehicle restrictions, performing one or more respective actions corresponding to the one or more vehicle restrictions that are violated. Additionally or alternatively to one or more of the examples disclosed above, in some examples, the one or more vehicle restrictions include a speed limit, and the one or more respective actions corresponding to the speed limit include generating a speed limit violation notification and/or preventing the vehicle from accelerating past the speed limit. Additionally or alternatively to one or more of the examples disclosed above, in some examples, the one or more vehicle restrictions include a geofence, and the one or more respective actions corresponding to the geofence include generating a geofence violation notification and/or operating the vehicle in an autonomous driving mode to remain within the geofence. Additionally or alternatively to one or more of the examples disclosed above, in some examples, the processor is further configured for, while operating in the remote access mode, in accordance with a determination that the mobile device is detected within a threshold distance of the vehicle, exiting the remote access mode.

Therefore, according to the above, some examples of the disclosure are directed to a method comprising: capturing one or more images at one or more cameras operatively coupled to a vehicle; transmitting, using a wireless transceiver, the one or more images to a mobile device; receiving, at the wireless transceiver, an input from the mobile device, the input comprising one of an indication to provide access to the vehicle and an indication to prevent access to the vehicle; and in response to receiving the indication to provide access to the vehicle: starting the vehicle in a remote access mode, and operating the vehicle with one or more vehicle restrictions associated with the remote access mode.

Therefore, according to the above, some examples of the disclosure are directed to a non-transitory computer readable storage medium having stored thereon a set of instructions for controlling access to a vehicle, the vehicle including a processor, which when executed by the processor cause the processor to perform a method comprising: capturing one or more images at one or more cameras operatively coupled to the vehicle; transmitting, using a wireless transceiver, the one or more images to a mobile device; receiving, at the wireless transceiver, an input from the mobile device, the input comprising one of an indication to provide access to the vehicle and an indication to prevent access to the vehicle; and in response to receiving the indication to provide access to the vehicle: starting the vehicle in a remote access mode, and operating the vehicle with one or more vehicle restrictions associated with the remote access mode.

Therefore, according to the above, some examples of the disclosure are directed to a vehicle comprising: one or more cameras; a wireless transceiver; and a processor operatively coupled to the one or more cameras and the wireless transceiver, the processor configured for: receiving, at the wireless transceiver, first one or more images of a first person of a plurality of people authorized to access the vehicle, the first one or more images associated with a first set of vehicle restrictions; capturing second one or more images of surroundings of the vehicle at the one or more cameras; determining whether, based on the first one or more images, the second one or more images include the first person authorized to access the vehicle; in accordance with a determination that the second one or more images include the first person authorized to access the vehicle: starting the vehicle in a first remote access mode, and operating the vehicle with the first set of vehicle restrictions; and in accordance with a determination that the second one or more images do not include a person of the plurality of people authorized to access the vehicle, preventing access to the vehicle. Additionally or alternatively to one or more of the examples disclosed above, in some examples, the processor further is configured for receiving, at the wireless transceiver, third one or more images of a second person of the plurality of people authorized to access the vehicle, the third one or more images associated with a second set of vehicle restrictions different from the first set of vehicle restrictions; capturing fourth one or more images of the surroundings of the vehicle at the one or more cameras; determining whether, based on the third one or more images, the fourth one or more images include the second person authorized to access the vehicle; and in accordance with a determination that the fourth one or more images include the second person authorized to access the vehicle: starting the vehicle in a second remote access mode, and operating the vehicle with the second set of vehicle restrictions.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A vehicle comprising:
   one or more cameras;
   a wireless transceiver; and
   a processor operatively coupled to the one or more cameras and the wireless transceiver, the processor configured for:
      capturing one or more images of surroundings of the vehicle at the one or more cameras;
      transmitting, using the wireless transceiver, the one or more images to a mobile device;
      receiving, at the wireless transceiver, an input from the mobile device, the input comprising one of an indication to provide access to the vehicle and an indication to prevent access to the vehicle; and
      in response to receiving the indication to provide access to the vehicle:
         starting the vehicle in a remote access mode, and operating the vehicle with one or more vehicle restrictions associated with the remote access mode.
2. The vehicle of claim 1, wherein the processor is further configured for:
   in response to receiving the indication to provide access to the vehicle:
      unlocking one or more locks coupled to one or more doors of the vehicle; and
      initializing a motor of the vehicle; and
   in response to receiving the indication to prevent access to the vehicle:
      preventing the one or more locks coupled to the one or more doors of the vehicle from being unlocked;
      preventing the initialization of the motor of the vehicle; and
      preventing the vehicle from operating in the remote access mode.
3. The vehicle of claim 1, wherein the vehicle restrictions associated with the remote access mode includes one or more of a geofence, an approved destination and a speed limit.
4. The vehicle of claim 1, wherein the vehicle further comprises an infotainment system with access to a plurality of files, the plurality of files including one or more of contact files, location files, and audio files stored thereon, and operating the vehicle with the one or more vehicle restrictions includes restricting access to one or more of the plurality of files.
5. The vehicle of claim 1, the processor further configured for:
   prior to capturing the one or more images at the one or more cameras, receiving an input to capture the one or more images.
6. The vehicle of claim 5, further comprising:
   a touchscreen disposed on an exterior of the vehicle proximate to one of the one or more cameras, wherein the input to capture the one or more images comprises an input detected at the touchscreen.
7. The vehicle of claim 5, wherein the input to capture the one or more images is generated by the mobile device and received by the transceiver.
8. The vehicle of claim 1, wherein the one or more images comprise a video.
9. The vehicle of claim 1, wherein the one or more vehicle restrictions restrict one or more of a vehicle speed, a vehicle location, and a navigation route of the vehicle.
10. The vehicle of claim 1, wherein the one or more vehicle restrictions are selected via one or more restriction inputs received from the mobile device.
11. The vehicle of claim 1, wherein the processor is further configured for:
   while operating the vehicle with the one or more vehicle restrictions associated with the remote access mode, monitoring the operation of the vehicle to determine whether the operation of the vehicle violates the one or more vehicle restrictions; and
   in accordance with a determination that the operation of the vehicle violates the one or more vehicle restrictions, performing one or more respective actions corresponding to the one or more vehicle restrictions that are violated.
12. The vehicle of claim 11, wherein the one or more vehicle restrictions include a speed limit, and the one or more respective actions corresponding to the speed limit include generating a speed limit violation notification and/or preventing the vehicle from accelerating past the speed limit.
13. The vehicle of claim 11, wherein the one or more vehicle restrictions include a geofence, and the one or more respective actions corresponding to the geofence include generating a geofence violation notification and/or operating the vehicle in an autonomous driving mode to remain within the geofence.

14. The vehicle of claim 1, wherein the processor is further configured for:
   while operating in the remote access mode, in accordance with a determination that the mobile device is detected within a threshold distance of the vehicle, exiting the remote access mode.

15. A method comprising:
   capturing one or more images at one or more cameras operatively coupled to a vehicle;
   transmitting, using a wireless transceiver, the one or more images to a mobile device;
   receiving, at the wireless transceiver, an input from the mobile device, the input comprising one of an indication to provide access to the vehicle and an indication to prevent access to the vehicle; and
   in response to receiving the indication to provide access to the vehicle:
      starting the vehicle in a remote access mode, and
      operating the vehicle with one or more vehicle restrictions associated with the remote access mode.

16. A vehicle comprising:
   one or more cameras;
   a wireless transceiver; and
   a processor operatively coupled to the one or more cameras and the wireless transceiver, the processor configured for:
      receiving, at the wireless transceiver, first one or more images of a first person of a plurality of people authorized to access the vehicle, the first one or more images associated with a first set of vehicle restrictions;
      capturing second one or more images of surroundings of the vehicle at the one or more cameras;
      determining whether, based on the first one or more images, the second one or more images include the first person authorized to access the vehicle;
      in accordance with a determination that the second one or more images include the first person authorized to access the vehicle:
         starting the vehicle in a first remote access mode, and
         operating the vehicle with the first set of vehicle restrictions; and
      in accordance with a determination that the second one or more images do not include a person of the plurality of people authorized to access the vehicle, preventing access to the vehicle.

17. The vehicle of claim 16, the processor further configured for:
   receiving, at the wireless transceiver, third one or more images of a second person of the plurality of people authorized to access the vehicle, the third one or more images associated with a second set of vehicle restrictions different from the first set of vehicle restrictions;
   capturing fourth one or more images of the surroundings of the vehicle at the one or more cameras;
   determining whether, based on the third one or more images, the fourth one or more images include the second person authorized to access the vehicle; and
   in accordance with a determination that the fourth one or more images include the second person authorized to access the vehicle:
      starting the vehicle in a second remote access mode, and
      operating the vehicle with the second set of vehicle restrictions.

* * * * *